Fig. 1
Fig. 2

INVENTOR.
RUSSELL F. GARNER
BY
his
ATTORNEY.

April 8, 1952     R. F. GARNER     2,591,802
THERMOSTATIC CONTROL SWITCH
Filed Feb. 15, 1950     8 Sheets-Sheet 2

Fig. 3.

INVENTOR.
RUSSELL F. GARNER.
BY
his ATTORNEY.

April 8, 1952 R. F. GARNER 2,591,802
THERMOSTATIC CONTROL SWITCH
Filed Feb. 15, 1950 8 Sheets-Sheet 3

Fig. 4.

INVENTOR.
RUSSELL F. GARNER.
BY
Albert J. Henderson
his ATTORNEY

April 8, 1952 R. F. GARNER 2,591,802
THERMOSTATIC CONTROL SWITCH
Filed Feb. 15, 1950 8 Sheets-Sheet 4

INVENTOR.
RUSSELL F. GARNER
BY
Albert J. Henderson
his ATTORNEY.

INVENTOR.
RUSSELL F. GARNER
BY
his ATTORNEY.

April 8, 1952

R. F. GARNER 2,591,802

THERMOSTATIC CONTROL SWITCH

Filed Feb. 15, 1950

INVENTOR.
RUSSELL F. GARNER.
BY
his ATTORNEY.

April 8, 1952  R. F. GARNER  2,591,802
THERMOSTATIC CONTROL SWITCH
Filed Feb. 15, 1950  8 Sheets-Sheet 7

Fig. 10.

INVENTOR.
RUSSELL F. GARNER.
BY
his ATTORNEY.

April 8, 1952 R. F. GARNER 2,591,802
THERMOSTATIC CONTROL SWITCH
Filed Feb. 15, 1950 8 Sheets-Sheet 8

INVENTOR.
RUSSELL F. GARNER.
BY
*Albert J. Henderson*
his ATTORNEY.

Patented Apr. 8, 1952

2,591,802

UNITED STATES PATENT OFFICE 2,591,802

THERMOSTATIC CONTROL SWITCH

Russell F. Garner, Youngwood, Pa., assignor to Robertshaw-Fulton Controls Company, Greensburg, Pa., a corporation of Delaware Application February 15, 1950, Serial No. 144,318

18 Claims. (Cl. 200—140)

This invention relates to thermostatic control switches and more particularly to control switches for electrically heated ovens provided with baking and broiling elements.

In my copending application Serial No. 144,319 filed of even date herewith there is disclosed a thermostatic control switch embodying a semi-floating member or toggle plate which operates switch arms normally biased to a position for energizing one of the heating elements in an electrically heated oven. When the switch arms are moved to another position, the one heating element is deenergized and the switch arms are positioned for energizing the other heating element. In both cases, the heating elements are under control of the main thermostatic switch to maintain a desired oven temperature for baking or broiling purposes.

The switch arms of the present invention are preferably flexible and cooperate with separate contact means positioned on opposite sides thereof to establish the desired heating arrangements. The switch arms may be biased into engagement with one contact means and a toggle plate is operatively engageable with the switch arms for operating the same against the bias. Means are provided for operating the toggle plate for moving the switch arms to disengage the one contact means and engage the other, said switch arms being flexed or bowed during such operation. A latching device serves to retain one end of the toggle plate in operated position while the opposite end permits return of the switch arms to their biased position for reengaging the one contact means. The toggle plate is released from the latched position by operation of the temperature responsive means at a predetermined temperature.

The foregoing sequence of operation provides for simultaneous energization of both heating elements in a preheat operation followed by a baking operation. The arrangement also provides for a broiling operation only or for a baking operation without preheat. Moreover, an auxiliary switch may be included to control energization of the broil element at a reduced wattage during operation of the baking element at full wattage thus providing some top heat during the baking operation.

An object of the present invention is to retain the preheat, bake and broil operations of prior thermostatic controls while simplifying the construction and preserving the accuracy of control.

Another object of the invention is to utilize switch parts common to both heating elements in a flexible arrangement for securing desired changes in heating arrangements.

Another object of the invention is to facilitate assembly of the device with or without provision for top heat during a baking operation.

Another object of the invention is to avoid meticulous adjustment of the operating parts by yieldably mounting such parts for self-adjustment.

Another object of the invention is to facilitate assembly and disassembly of the control switch by housing the switch parts in a single casing having a removable cover for easy access to the interior.

Other objects and advantages will become apparent from the following description taken in connection with the accompanying drawings wherein.

Referring more particularly to the embodiment shown in Figs. 1 to 6 inclusive, a cup-shaped casing 10 is provided with a cover 12 for the open end thereof carrying a centrally disposed bushing 14. An adjusting screw 16, preferably provided with left-hand threads, is cooperable with the bushing 14 and carries on its exterior end the usual handle 18 by means of which the adjusting screw 16 can be rotated.

Temperature responsive means in the form of an expansible and contractable diaphragm element 20 is carried on the interior end of the adjustable screw 16 and has an operating button 22 projecting therefrom. The interior of the diaphragm 20 is in communication with a capillary tube 24 which extends exteriorly of the cover 12 for communication with the usual bulb element 25 to be located in the oven. As is well known, the temperature responsive means contains a fluid which expands upon the bulb being heated and serves to actuate diaphragm 20 sufficiently to operate the parts to be described.

The button 22 abuts a depression 26 formed in the face of a main actuating lever 28 of a snap-action means. The main actuating lever 28 is provided at one end with a knife-edge 30 which is cooperable with a support 32 projecting from the casing 10. The opposite end of the lever 28 is also provided with a knife-edge 34 around which one end of a coil spring 36 is hooked.

A main control lever 38 of generally H-shaped configuration is provided with a knife-edge 40 formed in the center bar thereof for receiving the opposite hooked end of the coil spring 36. Preferably, an insulating section 41 is incorporated in each of the upper legs of the main control lever 38 to insulate them from the lower legs thereof. The lower legs are each provided with a knife-edge 44 for cooperation with suitable bearings formed on an adjustable bridge element 46 supported in the casing 10. Each of the upper legs carries a double-pole contact bridge 48, 48a for cooperation with pairs of fixed contacts 50, 51 and 52, 53 respectively carried by the casing 10. The contacts 51 and 52 carry terminal connections 54, 54a for line wires L1, L2 respectively, as will be described more fully in connection with Fig. 6.

Figure 1:
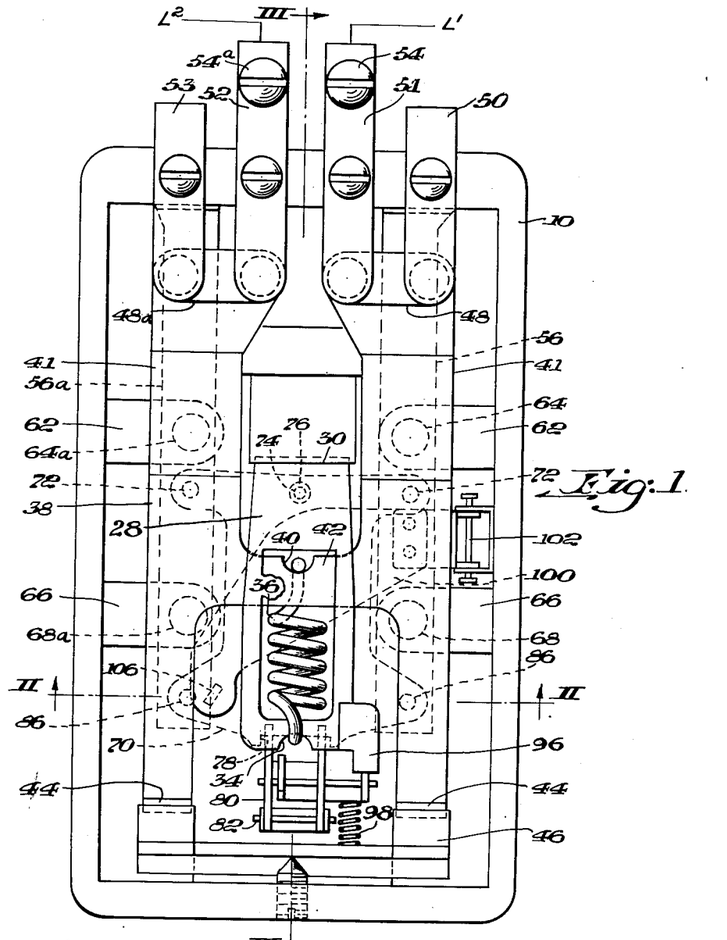
Fig. 1 is a front elevation of the control switch with the cover removed.
Figure 2:
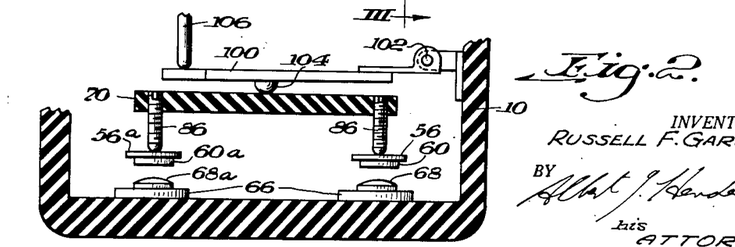
Fig. 2 is a cross section taken on the line II—II of Fig. 1.
Figure 3:
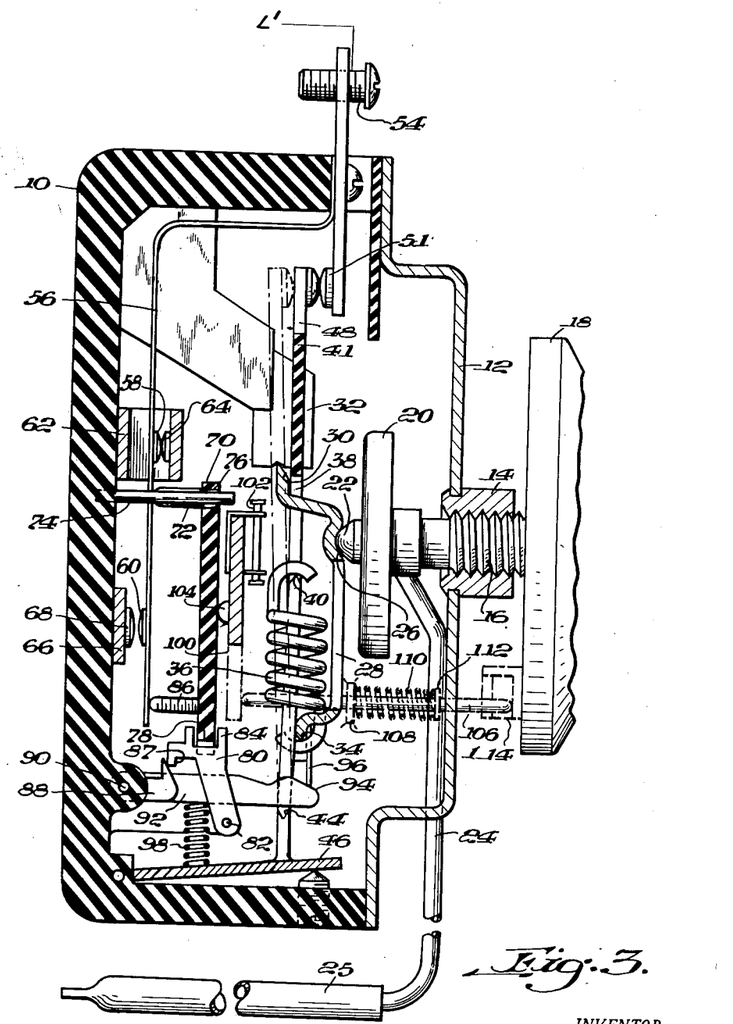
Figs. 3, 4 and 5 are longitudinal sections taken on the line III—III of Fig. 1 and showing the operating parts in different positions.

A pair of flexible switch arms 56, 56a is secured at one end to the contacts 50 and 53 respectively. The switch arms 56, 56a are formed of flexible material of an electrical conducting nature and extend rearwardly into the casing 10, substantially parallel with the control lever 38 of the snap-action means. The switch arm 56 carries a pair of contacts 58, 60 disposed on opposite sides thereof and spaced longitudinally one from the other. Likewise, the switch arm 56a carries a pair of contacts 58a, 60a. A pair of supports 62 project from opposite sides of the casing 10 respectively and carry relatively stationary or fixed contacts 64, 64a for cooperation with the contacts 58, 58a on the switch arms 56, 56a respectively. A second pair of supports 66 project interiorly of the casing 10 and carry relatively stationary or fixed contacts 68, 68a for cooperation with the contacts 60, 60a on the switch arms 56, 56a respectively. The switch arm 56 has an inherent bias for closing the contacts 58, 64 and opening the contacts 60, 68, as shown in Fig. 3 for example. The switch arm 56a is similarly biased relative to contacts 58a, 64a and 60a, 68a.

Means are provided for moving the flexible switch arms 56, 56a to open the contacts 58, 58a, 64, 64a and to close the contacts 60, 60a, 64, 64a. To this end, a movable member in the form of a toggle plate 70 of insulating material is provided for movement toward and away from the flexible switch arms 56, 56a and has a pair of projections 72 positioned on the free end of the plate 70 adjacent the supports 62. The projections 72 are operatively engageable with the switch arms 56, 56a respectively. The plate 70 is mounted in a semi-floating manner in the casing 10 by the provision of a support pin 74 which projects from the casing 10 between the switch arms 56, 56a and through an aperture 76 formed in the upper end of the plate 70 having the projections 72 thereon.

Sufficient clearance exists between the pin 74 and the aperture 76 to provide for free slidable movement of the plate 70 toward the switch arms 56, 56a. In its initial or unoperated position, the plate 70 occupies the position in Fig. 3, but is adapted to be moved to the position shown in Figs. 4 and 5 as will be hereinafter apparent. The opposite or lower end of the plate 70 is provided with a recess 78 for the reception of a rocker 80 which is pivoted at 82 in the casing 10. The walls of the recess 78 cooperate with the rocker 80 to form interengaging means for guiding the lower end of the plate 70 during movement of the rocker 80 on its pivot 82. A pair of upstanding lugs 84 formed on the rocker 80 are operatively engageable with opposite sides of the plate 70 to transmit pivotal movement thereto as the rocker 80 rotates on the pivot 82.

Means are provided for moving the switch arms 56, 56a up to the stop formed by the fixed contacts 68, 68a and such means take the form of a pair of adjusting screws 86 carried by the plate 70 intermediate the rocker 80 and the free end of the plate 70. It will be observed that the projections 72 on the free end of the plate 70 are capable of causing flexing or bowing of the switch arms 56, 56a when the stop formed by the relatively stationary contacts 68, 68a is effective on the switch arms 56, 56a.

Means for latching the plate 70 and maintaining the switch arms 56, 56a in an operative position are provided. The latching means takes the form of a notch portion 87 formed on the rocker 80 and being adapted to be engaged by a pawl 88 which is pivotally mounted at 90 in the casing 10. The pawl 88 carries a release arm 92 which projects therefrom beyond the rocker 80 and has a ramp 94 formed thereon adjacent the main actuating lever 28 of the snap-action means. A trigger member 96 is carried by the main actuating lever 28 for operative engagement with the ramp 94 and will serve to rotate the release arm 92 in a clockwise direction as the actuating lever 28 likewise rotates about its knife-edge 30. A coil spring 98 is operative between the bridge element 46 and the underside of the release arm 92 for biasing the pawl 88 into latching engagement with the notch 87 carried by the rocker 80. However, in the unoperated position of the parts, as shown in Fig. 3, the latching arrangement is ineffective due to disengagement of the pawl 88 from the notch 87.

Actuating means in the form of an operating lever 100 is provided for moving the plate 70 to its operative positions. The operating lever 100 extends between the plate 70 and the snap-action means and is mounted at one end on a pivot 102 in the casing 10 on one side of the plate 70. Due to this arrangement, the operating lever 102 is movable in a path transverse to the path of movement of the plate 70. A projection 104 on the operating lever 100 engages with the plate 70 at the median portion thereof for operating the same.

Manually operable means are provided for operating the operating lever 100 from the handle 18 and take the form of a plunger 106 which projects through the cover 12 and through a suitable bearing 108 carried thereon into operative engagement with the free end of the second operating lever 100, remote from the pivot 102. A coil spring 110 is operative between the bearing 108 and an abutment 112 carried on the plunger 106 for returning the latter to its initial position following the manual operation. Convenient means for operating the plunger 106 at an appropriate angle of rotation of the handle 18 may be provided by a cam element 114 carried on the handle 18 for this purpose. It will be understood, however, that such connection between the handle 18 and the plunger 106 is not essential and that the latter could be separately operated by a push button, if so desired. In the embodiment shown and described herein, the cam element 114 is positioned on the handle 18 so that the plunger 106 will be operated whenever the handle 18 is rotated to the usual broil position. Such operation will be described in connection with the schematic embodiment shown in Fig. 6 of the drawings which follows immediately.

*Operation*

Figure 6:
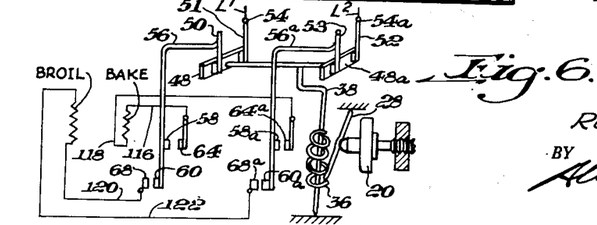
Fig. 6 is a schematic view showing the electrical connections applicable to the embodiment shown in Figs. 1 to 5 inclusive.

Referring more particularly to Figs. 3 and 6 of the drawings, the usual bake element is shown in Fig. 6 as being connected to the fixed contacts 64, 64a and the broil element to the fixed contacts 68, 68a. The dial or handle 18 being in the "off" position, the button 22 will have caused the snap-action mechanism to hold the control lever 38 in the broken-line position, shown in Fig. 3, with the contact bridges 48, 48a in open position. When the handle 18 is rotated clockwise to any temperature setting, except broil, then the adjusting screw 16 and the diaphragm 20 will move away from the main actuating lever 28 of the snap-action means, allowing the control lever 38 to snap to the full-line position shown in Fig. 3.

In such position of the control lever 38 the contact bridges 48, 48a are closed. As the contacts 58, 64, 58a, 64a controlling the bake element are initially closed due to the inherent bias of the flexible switch arms 56, 56a, then current will flow to the bake element by way of line wire L1, terminal 54, fixed contact 51, contact bridge 48, fixed contact 50, switch arm 56, contacts 58, 64, wire 116, bake element, wire 118, contacts 58a, 64a, switch arm 56a, fixed contact 53, contact bridge 48a, fixed contact 52 and terminal 54a to line wire L2.

When the diaphragm 20 expands at the predetermined temperature set by the handle 18, it will force the main actuating lever 28 away from the adjusting screw 16, causing the control lever 38 to snap to the broken-line position shown in Fig. 3. Consequently, the circuit previously traced is broken by the main control switch and will remain broken until the diaphragm 20 again contracts to allow the main actuating lever 28 to move toward the adjusting screw 16 and repeat the operation.

When the handle 18 is rotated clockwise to the broil position, then the adjusting screw 16 and diaphragm 20 will be moved away from the main actuating lever 28 of the snap-action mechanism, thus allowing the main control lever 38 to move to its full line position as shown in Fig. 3. At the same time, the cam element 114 will engage the plunger 106 and move it inwardly of the casing 10 into operative engagement with the operating lever 100. The operating lever 100 is thus rotated on its pivot 102 toward the plate 70 which immediately starts to pivot in a clockwise direction, as viewed in Figs. 3 and 4.

The described pivoting motion of the plate 70 occurs due to the bias of the flexible switch arms 56, 56a. The rocker 80 is therefore carried in a counterclockwise direction about its pivot 82. Consequently, the contacts 60, 68, 60a, 68a are moved into operative engagement prior to the time that the contacts 58, 64 and 58a, 64a become disengaged. Thus, the circuit of the broil element is made prior to the time that the previously traced circuit to the bake element is broken. It will be apparent, however, that the inherent bias of the switch arms 56, 56a and the spacing of the broil contacts 60, 68, 60a, 68a could be rearranged to dispense with or vary this sequential feature if so desired.

Figure 4:
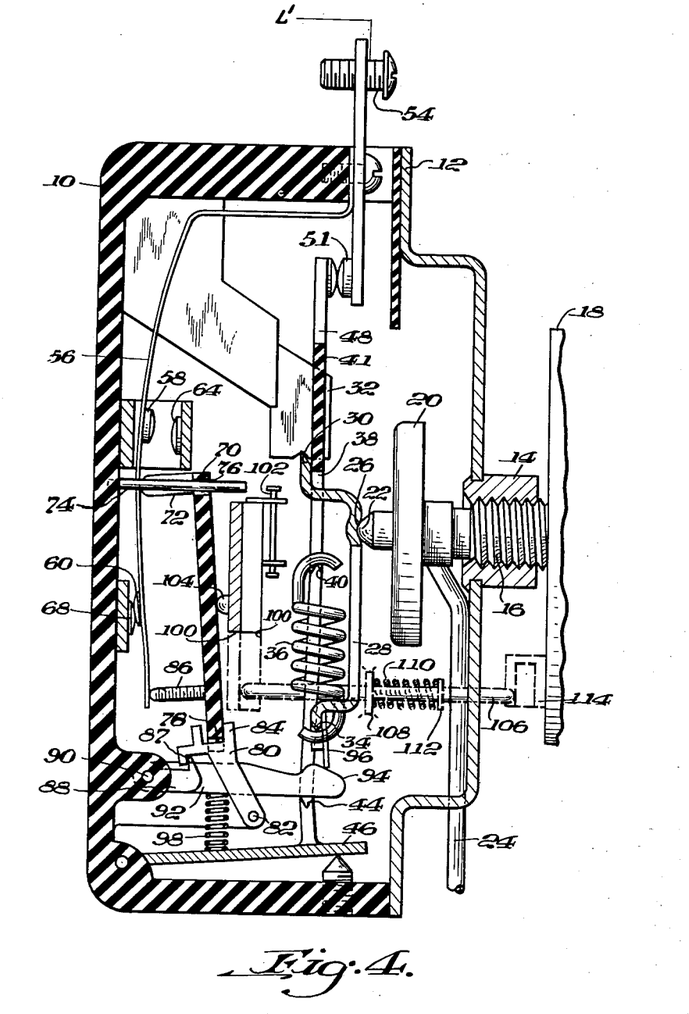
Figure 5:
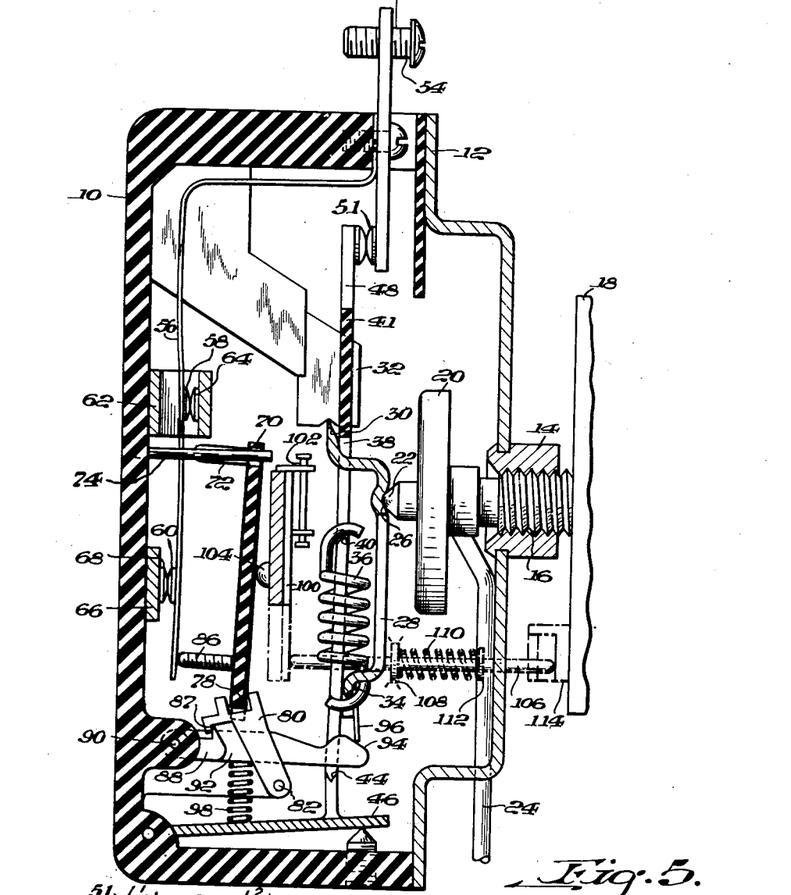

As shown more clearly in Fig. 4, the counterclockwise movement of the rocker 80 causes the end thereof carrying the notch 86 to ride over the pawl 88 which thereupon is biased by the spring 98 into latching engagement on the opposite side. Since the contacts 60, 60a carried on the movable switch arms 56, 56a have been moved by the plate 70 up to the stop formed by the relatively fixed contacts 68, 68a then further movement of the plate 70 will result in a flexing or bowing of the flexible switch arms 56, 56a to separate the contacts 58, 58a still further from the relatively stationary contacts 64, 64a. It will be apparent that the adjusting screws 86 carried by the lever 70 in engagement with the free ends of the flexible switch arms 56, 56a will serve to maintain close engagement between the contacts 60, 68 and 60a, 68a during the bowing of the flexible switch arms 56, 56a as described. Thus, as shown in Figs. 4 and 5 the terminal ends of the switch arms 56, 56a beyond the contacts 60, 68, 60a, 68a are sufficiently bowed to compensate for wear on these contacts and provide good contact pressure at all times.

The circuit for the broil element may be traced on Fig. 6 as follows: line wire L1, terminal 54, fixed contact 51, contact bridge 48, fixed contact 50, switch arm 56, contacts 60, 68, wire 120, broil element, wire 122, contacts 68a, 60a, switch arm 56a, fixed contact 53, contact bridge 48a, fixed contact 52 and terminal 54a to line wire L2. As long as the handle 18 remains in the broil position, the broil circuit will remain energized unless the diaphragm 20 expands sufficiently to open the contact bridges 48, 48a as previously described. It will be apparent that the latching device for the plate 70 does not perform any function during a normal broil operation since the plunger 106 remains held in an inwardly projected position relative to the casing 10 by the cam element 114. Consequently, the trigger 96 and release arm 94 serve merely to disengage and engage the pawl 88 and notch 87 as the main actuating lever 28 moves upon expansion and contraction of the diaphragm 20.

Upon return of the handle 18 to the "off" position, the adjusting screw 16 and diaphragm 20 will be moved sufficiently far to the left, as viewed in the drawings, to actuate the snap-action mechanism and cause the main control lever 38 thereof to assume the broken-line position. Thus, the contact bridges 48, 48a will be open and no current will flow to either the bake or broil elements, even though the bake contacts 58, 64 and 58a, 64a are now closed due to the inherent bias of the switch arms 56, 56a. At this time the latching device is released due to operation of the main actuating lever 28 and retraction of the plunger 106 under bias of the spring 110 when freed from the cam element 114. Such action will be described more fully in connection with the preheating operation which follows.

The preheating operation previously mentioned may be conducted by rotation of the handle 18 to the broil position and immediately back to any desired baking temperature setting. The position of the parts during the preheat cycle is shown in Fig. 5. Thus, movement of the handle 18 to the broil position will serve to open the bake contacts 58, 64 and 58a, 64a and engage the broil contacts 60, 68 and 60a and 68a as previously described in connection with Fig. 4. During such operation the rocker 80 acts as a movable pivot for the plate 70 and the latter becomes latched in its operated position.

However, when the handle 18 is rotated in a reverse direction from the initial broil position, then the cam element 114 becomes disengaged from the plunger 106 which thereupon returns under bias of the spring 110 to its initial outwardly projected position. The second operating lever 100 is thereupon moved on its pivot 102 by a clockwise movement of the plate 70 under bias of the flexible switch arms 56, 56a. It will be observed that only the upper end of the plate 70 is permitted to move at this time due to the opposite lower end being held in latched position by the rocker 80 and pawl 88. Moreover, the free ends of the flexible switch arms 56, 56a are held against movement by the adjusting screws 86 so that the contacts 60, 68 and 60a, 68a controlling the broil element remain engaged.

The return movement of the flexible switch arms 56, 56a under their inherent bias causes engagement of the bake contacts 58, 64 and 58a, 64a as shown in Fig. 5. Consequently, both the bake and broil circuits are made as previously traced. Both elements are therefore energized at full wattage for quickly preheating the oven in which such elements are installed.

The preheating cycle is terminated by operation of the diaphragm 20 which expands at the predetermined temperature set by the handle 18 to pivot the main actuating lever 28 away from the adjusting screw 16. This causes trigger 96 to ride along the ramp 94 on the release arm 92 until the bias of the coil spring 98 is overcome sufficiently to release the pawl 88. Thus, the plate 70 being no longer held by the latching mechanism is permitted to rotate in a counterclockwise direction about the projections 72 to disengage the contacts 60, 68 and 60a, 68a controlling the broil circuit. However, it will be observed that the bake circuit remains conditioned for energization through the contacts 58, 64 and 58a, 64a as soon as the contact bridges 48, 48a again close. Continued engagement of the contacts 58, 64 and 58a, 64a controlling the bake circuit is due to the inherent bias of the flexible switch arms 56, 56a and the parts are now in the position shown in Fig. 3 under control of the snap-action mechanism.

*Modified disclosure*

Referring more particularly to the modified form of control switch shown in Figs. 7 to 12 inclusive of the drawings, the structural embodiment follows very closely that previously described and shown in connection with the previously described embodiment. The flexible switch arms in this modified form are dissimilar however and comprise one arm 126 secured at one end to the contact 53. The switch arm 126 carries the pair of contacts 58a, 60a disposed on opposite sides thereof and spaced longitudinally one from the other. The relatively stationary or fixed contacts 64a, 68a cooperate with the contacts 58a, 60a respectively, as in previously described embodiment.

The switch arm 126, however, carries an insulating plate 128 which depends therefrom toward the bottom of the casing 10 for operative engagement with a movable contact arm 130 which is carried by the support 66 and has a contact 132 secured thereto. A support 134 is secured to the casing 10 and extends around the insulating plate 128 and the movable switch arm 130 and carries a relatively stationary contact 136 for cooperation with the movable contact 132. The movable switch arm 130 is preferably made of metallic spring material having an inherent bias toward the relatively fixed contact 136 and being adapted to conduct current between the supports 66 and 134 when the contacts 132, 136 respectively, are engaged.

An adjusting screw 138 projects from the plate 70 into operative engagement with the movable contact arm 130 for opening the contacts 132, 136 at the appropriate time hereinafter described. The insulating plate 128 is adapted to be engaged by the movable contact arm 130 for overcoming the bias of the flexible switch arm 126 and closing the contacts 60a, 68a. The contacts 60a, 68a form a stop for subsequent bowing of the switch arm 126 as in the previously described embodiment.

Figures 7, 8:
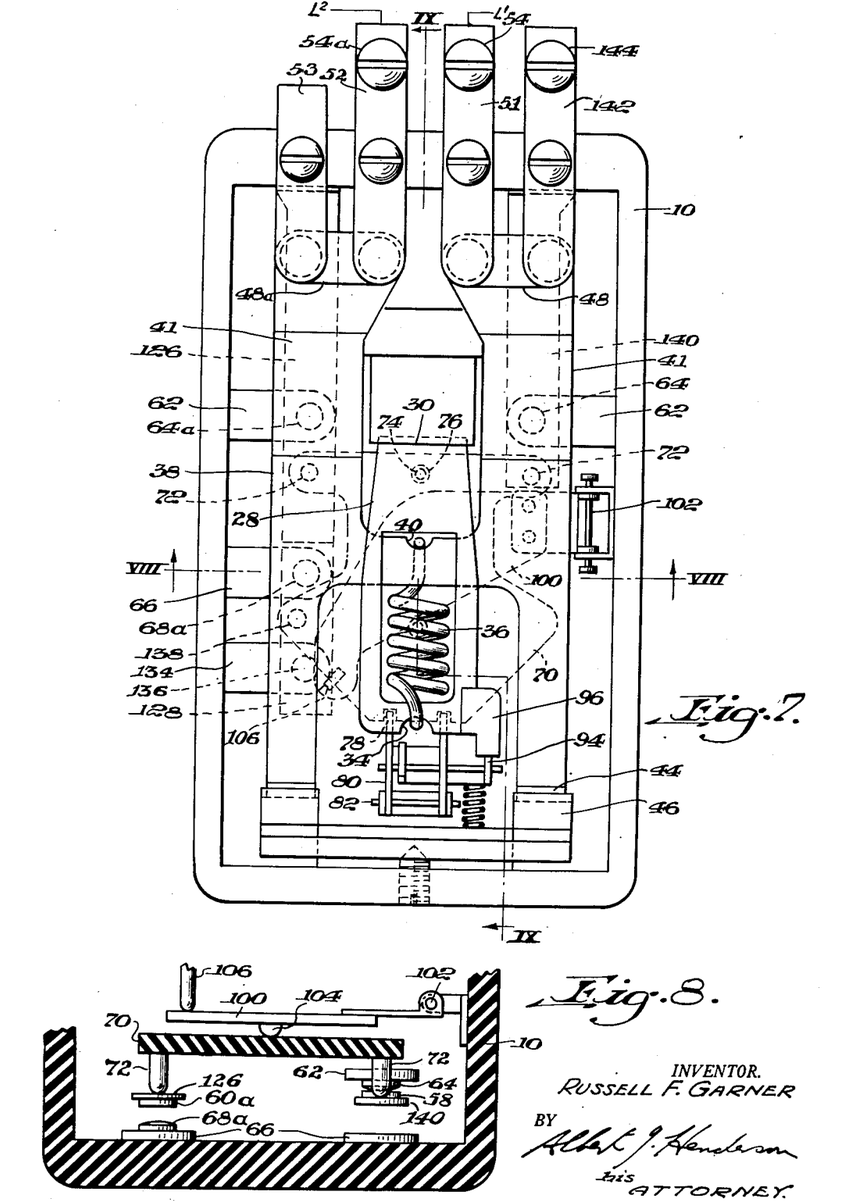
Fig. 7 is a front elevation of a modified form of control switch with the cover removed.
Fig. 8 is a cross section taken on the line VIII—VIII of Fig. 7.

The other flexible switch arm, designated by the reference numeral 140 in Fig. 7, terminates immediately below the related support 62 in this embodiment. Consequently, the switch arm 140 carries only a single contact 58 for cooperation with the related stationary contact 64 on the support 62. However, as in the previously described embodiment, the switch arm 140 is connected at one end to a fixed contact 142 carried by the casing 10 and having a terminal connection 144 thereon. The contact bridge 48 associated with the fixed contact 142 also cooperates with a fixed contact 51 having the terminal connection 54 as in the previously described embodiment.

*Operation of modified form*

Figures 11, 12:
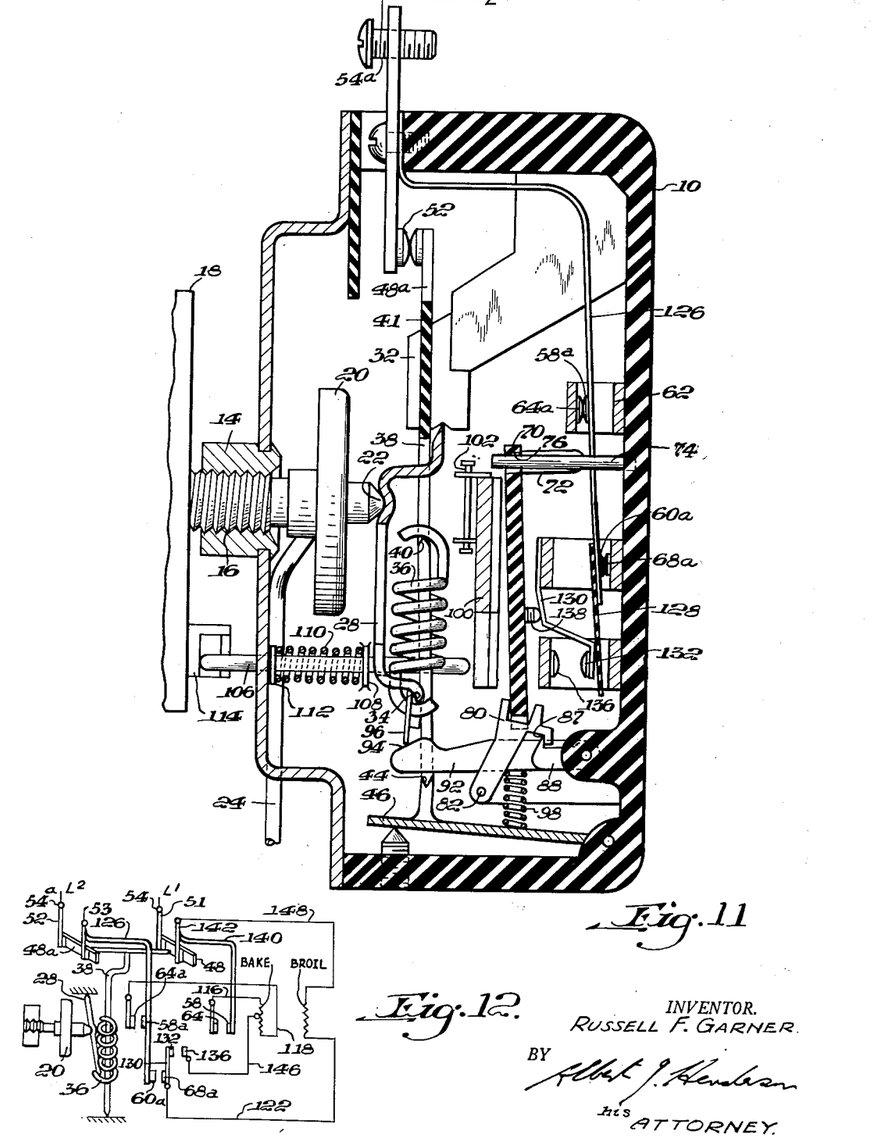
Fig. 12 is a schematic view showing the electrical connections applicable to the embodiment shown in Figs. 7 to 11 inclusive.

Referring more particularly to Fig. 12 of the drawings, the bake element is shown as being connected to the fixed contacts 64, 64a as in the previously described embodiment. The bake element is however, provided with a tap 146 which is connected to contact 136. The broil element is connected to the single fixed contact 68a at one end and the opposite end is connected directly by wire 148 to the fixed contact 142.

Figure 9:
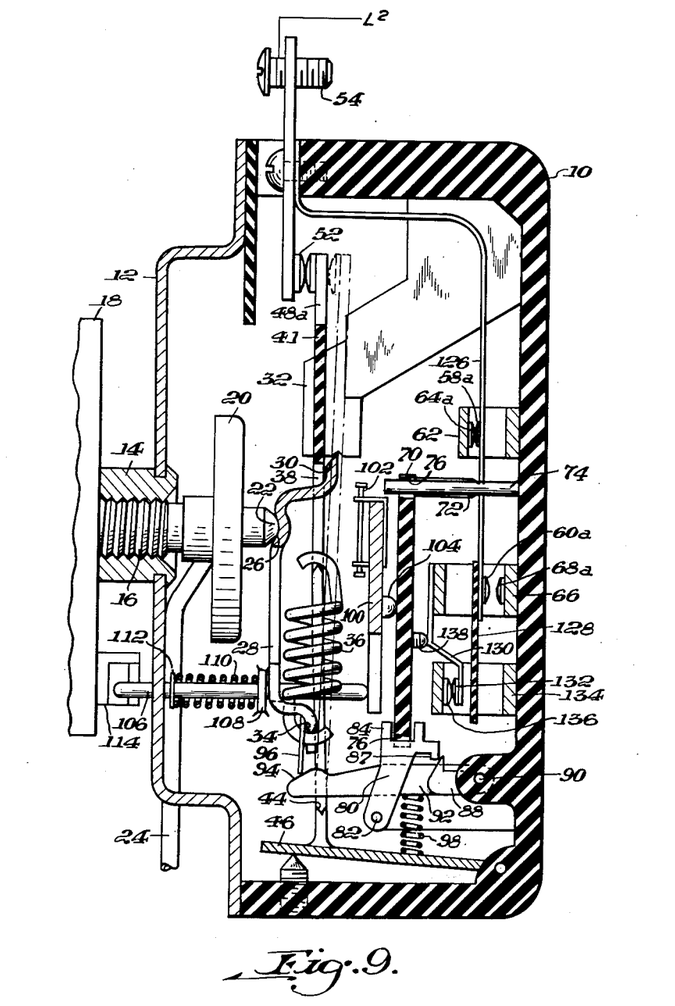
Figs. 9, 10 and 11 are longitudinal sectional views taken on the line IX—IX of Fig. 7 and showing the parts in different positions of operation.

The dial or handle 18 being in the "off" position, the button 22 will have caused the snap-action mechanism to hold the control lever 38 in the broken-line position shown in Fig. 9 of the drawings with the contact bridges 48, 48a in open position. When the handle 18 is rotated clockwise to any temperature setting, except broil, then the adjusting screw 16 and the diaphragm 20 will move away from the main actuating lever 28 of the snap-action means, allowing the control lever 38 to snap to the full-line position shown in Fig. 9. In such position, the contact bridges 48, 48a are closed. As the contacts 58, 64 and 58a, 64a controlling the bake element are initially closed due to the inherent bias of the flexible switch arms 126, 140 respectively, then current will flow to the bake element by way of line wire L1, terminal 54, fixed contact 51, contact bridge 48, fixed contact 142, switch arm 140, contacts 58, 64, wire 116, bake element, wire 118, contacts 58a, 64a, switch arm 126, fixed contact 53, contact bridge 48a, fixed contact 52 and terminal 54a to line wire L2.

When the diaphragm 20 expands at the predetermined temperature set by the handle 18, it will force the main actuating lever 28 away from the adjusting screw 16, causing the control lever 28 to snap to the broken-line position shown in Fig. 9 of the drawings. Consequently, the circuit previously traced is broken by the main control switch and will remain broken until the diaphragm 20 again contracts to allow the main actuating lever 28 to move toward the adjusting screw 16 and repeat the operation.

During the foregoing operation, some heat from the broil element is supplied to the oven to provide uniform baking conditions therein. Thus, an auxiliary circuit may be traced as follows, line wire L1, terminal 54, fixed contact 51, contact bridge 48, fixed contact 142, wire 148, broil element, wire 122, contact arm 130, contacts 132, 136, tap 146, bake element, wire 118, contacts 58a, 64a, switch arm 126, fixed contact 53, contact bridge 48a, fixed contact 52 and terminal 54a to line wire L2. Thus, in the baking circuit arrangement, the bake element will operate at maximum current while the broil element will operate at less than one-fourth wattage.

Figure 10:
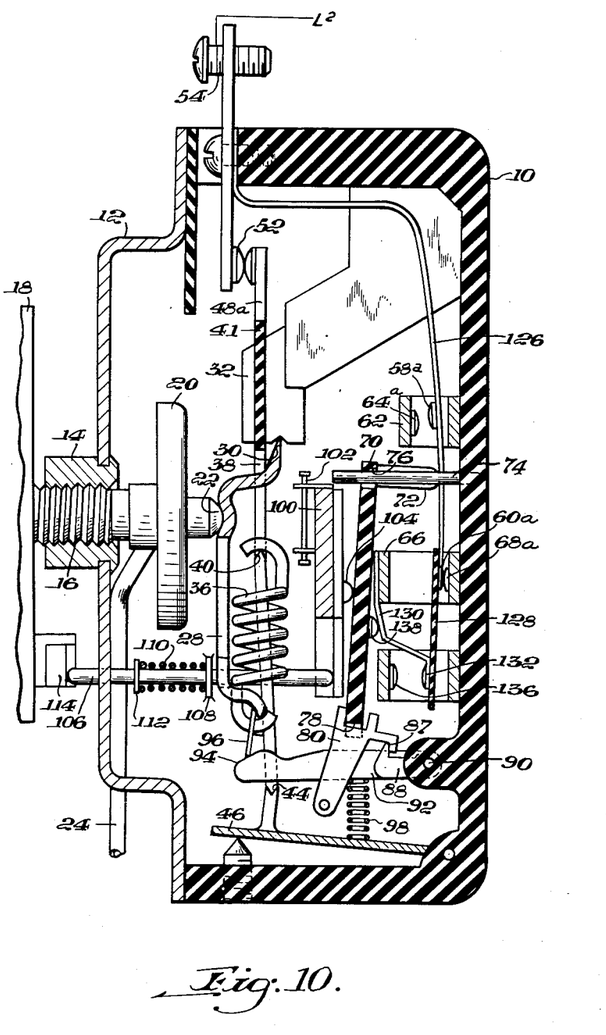

When the handle 18 is rotated clockwise to the broil position, then the adjusting screw 16 and diaphragm 20 will be moved away from the main actuating lever 28 of the snap-action mechanism thus allowing the main control lever 38 to move to its full line position as shown on Fig. 10. At the same time, the cam element 114 will engage the plunger 106 and move it inwardly of the casing 10 into operative engagement with the operating lever 100 carrying the projection 104 thereon into operative engagement with the plate 70. It will be observed that although the plate 70 is supported on the pin 74 at one end and the rocker 80 at the other, it is still free to move at both ends. However, the described bias of the flexible switch arms 126, 140 serves to hold the upper end of the plate 70 stationary relative to the lower end thereof. Consequently, the projections 72 and the screw 138 carried by the plate 70 move the flexible switch arms 126, 140 and the contact arm 130 respectively, to close the contacts 60a, 68a and open the contacts 132, 136 prior to the time that contacts 58, 64 and 58a, 64a open and discontinue the bake circuit. As in the previously described embodiment, this sequential feature could be dispensed with or varied as desired.

At the same time, the rocker 80 is rotated by the plate 70 clockwise (Fig. 10) and engages the pawl 88 to overcome the bias of the spring 98 to cause a counterclockwise rotation of the release arm 94. The notch 87 on the rocker 80 then becomes engaged by the pawl 88 and is held in such position due to the bias of the spring 98. Further movement of the operating lever 100 serves to pivot the plate 70 in a clockwise direction. As the contacts 60a, 68a are engaged they form a stop for the switch arm 126 which thereupon is flexed or bowed against its inherent bias. Such flexing or bowing of the switch arm 126 serves merely to separate the contacts 58a, 64a controlling one side of the line to the bake element still further. The opposite side of the line to the bake element is, of course, opened by disengagement of the contacts 58, 64 by operation of the switch arm 140. Moreover, the adjusting screw 138 carried by the plate 70 moves sufficiently far to the right carrying with it the movable contact arm 130 to operatively engage the latter with the insulating plate 128.

The circuit for the broil element may be traced on Fig. 12 as follows; line wire L1, terminal 54, fixed contact 51, contact bridge 48, fixed contact 142, wire 148, broil element, wire 122, contacts 68a, 60a, switch arm 126, fixed contact 53, contact bridge 48a, fixed contact 52 and terminal 54a to line wire L2. The broil element will remain energized as long as the handle 18 remains in the broil position, unless the diaphragm 20 expands sufficiently to open the contact bridges 48, 48a as previously described.

Upon return of the handle 18 to the "off" position, the adjusting screw 16 and diaphragm 20 will be moved sufficiently far to the right, as viewed in the drawings to actuate the snap-action mechanism and cause the main control lever 38 thereof to assume the broken-line position. Thus, the contact bridges 48, 48a will be open and no current will flow to either the bake or broil elements, even though the bake contacts 58, 64 and 58a, 64a are now closed due to the inherent bias of the switch arms 126, 140.

A preheating operation may be conducted with the structure shown in Figs. 7 to 11 inclusive by rotating the handle 18 to the broil position and then immediately back to a desired baking temperature setting. The position of the parts during preheat is shown in Fig. 11 wherein it will be observed that both the bake and broil elements are energized through their respective contacts and that the contacts 132, 136 controlling the tap 146 are open. Consequently, during the preheat cycle both the bake and broil elements will be energized at full wattage through the circuits previously traced.

It will be apparent that this preheat condition is obtained due to the latching of the plate 70 by the rocker 80 and pawl 88 when the handle 18 is initially turned to the broil position as previously described. As the handle is reversely rotated to the bake position the cam element 114 becomes disengaged from the plunger 106 but the spring 110 operates to move the plunger 106 outwardly of the casing 10 to its original position. Thus, the operating lever 100 no longer forces the plate 70 to rotate clockwise as under normal broil conditions. However, the lower end of the plate 70 is still held in latched position so that only the projections 72 can move in a counterclockwise direction for closing the contacts 58, 64 and 58a, 64a controlling the bake circuit.

When the diaphragm 20 expands, then the main actuating lever 28 will operate the snap-action mechanism to open the contact bridges 48, 48a as previously described. The trigger 96 will ride up the ramp 94 to release the plate 70 from the latching mechanism comprising the pawl 88 and notch 87 as previously described. Thus, the contact 60a, 68a controlling the broil element return to the open position shown in Fig. 9, and the contacts 132, 136 are also moved to closed position due to the inherent bias of the movable contact arm 130 assisted by the engagement of plate 128 with the contact arm 130. Upon movement of the diaphragm element 20 and the main actuating lever 28 away from the control lever 38, then the contact bridges 48, 48a will close and the circuit to the bake element with partial current flowing through the broil element will occur. Since the bake circuit has been previously traced herein further description is deemed unnecessary.

While two embodiments of the invention have been shown and described herein, it will be apparent that various other modifications may be made in the details of construction and arrangement of parts within the scope of the appended claims.

I claim:

1. A thermostatic control device comprising a main switch, temperature responsive means for operating said main switch, a flexible switch arm connected at one end to said main switch, first contact means adapted for engagement with one side of said switch arm and forming a stop for the opposite end thereof, second contact means adapted for engagement with the opposite side of said switch arm and being positioned intermediate said connected end and said first contact means, said switch arm having an initial bias toward engagement with said second contact means, a movable member operatively engageable with said switch arm adjacent said second contact means, and means for operating said movable member for moving said switch arm up to the stop formed by said first contact means and thereafter bowing said switch arm between said connected end and said first contact means.

2. A thermostatic control device comprising a main switch, temperature responsive means for operating said main switch, a flexible switch arm connected at one end to said main switch, first contact means adapted for engagement with one side of said switch arm and forming a stop for the opposite end thereof, second contact means adapted for engagement with the opposite side of said switch arm and being positioned intermediate said connected end and said first contact means, said switch arm having an initial bias toward engagement with said second contact means, a movable member having at least one free end operatively engageable with said switch arm adjacent said second contact means, a pivot for the opposite end of said movable member, and operating means engageable with said movable member intermediate said pivot and said free end thereof for moving said switch arm up to the stop formed by said first contact means and thereafter bowing said switch arm between said connected end and said first contact means.

3. A thermostatic control device as claimed in claim 2 wherein means on said movable member operatively engage said switch arm adjacent said first contact means to prevent disengagement therebetween upon return movement of said switch arm.

4. A thermostatic control device comprising a main switch, temperature responsive means for operating said main switch, a pair of relatively stationary contacts adapted for connection to said main switch and being spaced one from the other, a movable switch arm extending from said main switch for closing said contacts and being biased toward one of said contacts, a movable member having at least one free end operatively engageable with said switch arm intermediate said contacts, means for guiding said free end of the movable member to establish said operative engagement, a rocker pivoted adjacent the opposite end of said movable member, interengaging means on said rocker and said movable member for guiding said opposite end during pivotal movement of said rocker, and operating means engageable with said movable member intermediate said rocker and said free end for overcoming the bias of said switch arm and closing said other contact.

5. A thermostatic control device as claimed in claim 4 wherein a handle is provided for adjusting said temperature responsive means, and connecting means between said handle and said operating means operative in one position of said handle for pivotal movement of said movable member and said rocker.

6. A thermostatic control device comprising a main switch, temperature responsive means for operating said main switch, a flexible switch arm connected at one end to said main switch, first contact means adapted for engagement with one side of said switch arm and forming a stop for the opposite end thereof, second contact means adapted for engagement with the opposite side of said switch arm and being positioned intermediate said connected end and said first contact means, said switch arm having an initial bias toward engagement with said second contact means, a movable member having at least one free end operatively engageable with said switch arm adjacent said second contact means, means for guiding said free end of the movable member to establish said operative engagement, a rocker pivoted adjacent the opposite end of said movable member, interengaging means on said rocker and said movable member for guiding said opposite end during pivotal movement of said rocker, operating means engageable with said movable member intermediate said rocker and said free end for moving said switch arm up to the stop formed by said first contact means and thereafter bowing said switch arm between said connected end and said first contact means, a handle for adjusting said temperature responsive means, and connecting means between said handle and said operating means operative in one position of said handle for pivotal movement of said movable member and said rocker.

7. A thermostatic control device comprising a main switch, temperature responsive means for operating said main switch, an auxiliary switch including a movable switch arm connected to said main switch and being biased to one controlling position, a semi-floating member operatively engageable with said switch arm, movable pivot means for said member, means for operating said member and pivot in one direction for moving said switch arm to another controlling position said operating means being biased to unoperated position, latching means operatively engageable with said pivot upon movement thereof in said one direction for maintaining said switch arm in said other position while said operating means returns to said unoperated position, and connecting means between said latching means and said temperature responsive means for releasing said member at a predetermined temperature.

8. A thermostatic control device comprising a main switch, temperature responsive means for operating said main switch, an auxiliary switch including a movable switch arm connected to said main switch and being biased to one controlling position, a toggle plate operatively engageable with said switch arm and subject to the bias thereof, movable pivot means for said toggle plate, means for operating said toggle plate and pivot in one direction and moving said switch arm to another controlling position, said operating means being biased to unoperated position, a pivoted element biased into operative engagement with said movable pivot and effective upon movement thereof in said one direction for maintaining said switch arm in said other position while said operating means returns to said unoperated position, and connecting means between said pivoted element and said temperature responsive means for overcoming the bias of said pivoted element and releasing said movable pivot for movement of said toggle plate in an opposite direction at a predetermined temperature.

9. A thermostatic control device as claimed in claim 8 wherein temperature adjustment means are provided for said temperature responsive means, and means carried by said temperature adjustment means for operative engagement with said operating means for operating the same.

10. A thermostatic control device comprising a main switch, an auxiliary switch including a movable switch arm connected to said main switch and being biased to one controlling position, a toggle plate operatively engageable with said switch arm, means for operating said toggle plate in one direction for moving said switch arm to another controlling position, said operating means being biased to unoperated position, latching means operatively engageable with said toggle plate upon movement thereof in said one direction for maintaining said switch arm in said other position while said operating means returns to said unoperated position, snap-action means including a main actuating lever for operating said main switch, temperature responsive means operatively associated with said main actuating lever for operating said snap-action means, and connecting means between said latching means and said main actuating lever for releasing said toggle plate and causing movement of said switch arm to said one position at a predetermined temperature.

11. A thermostatic control device as claimed in claim 10 wherein a handle is provided for adjusting said temperature responsive means to different temperature settings, said handle having means operatively engageable with the operating means for said toggle plate for operating the same.

12. A thermostatic control device comprising a main switch, temperature responsive means for operating said main switch, a flexible switch arm connected at one end to said main switch, first contact means adapted for engagement with one side of said switch arm forming a stop for the opposite end thereof, second contact means adapted for engagement with the opposite side of said switch arm and being positioned intermediate said connected end and said first contact means, said switch arm having an inherent bias toward engagement with said second contact means, a toggle plate operatively engageable with said switch arm, means for operating said toggle plate in one direction for moving said switch arm up to the stop formed by said first contact means and thereafter bowing said switch arm between said connected end and said first contact means, and latching means for said toggle plate effective upon movement thereof in another direction for maintaining said opposite end of the switch arm at said stop while said switch arm returns under said bias toward engagement with said second contact means.

13. A thermostatic control device as claimed in claim 12 wherein means carried by said temperature responsive means are adapted for operative engagement with said latching means for releasing said toggle plate at a predetermined temperature.

14. A thermostatic control device comprising a main switch, temperature responsive means for operating said main switch, a flexible switch arm connected at one end to said main switch, first contact means adapted for engagement with one side of said switch arm forming a stop for the opposite end thereof, second contact means adapted for engagement with the opposite side of said switch arm and being positioned intermediate said connected end and said first contact means, said switch arm having an inherent bias toward engagement with said second contact means, a toggle plate having at least one free end operatively engageable with said switch arm adjacent said second contact means, means for operating said toggle plate in one direction for moving said switch arm up to the stop formed by said first contact means and thereafter bowing said switch arm between said connected end and said first contact means, abutment means carried by the opposite end of said toggle plate and operatively engageable with said opposite end of said switch arm, latching means for said toggle plate effective upon movement thereof in said one direction for maintaining said opposite end of the switch arm at said stop and in engagement with said first contact means, said free end of the toggle plate being returned to initial position under said bias of the switch arm upon release of said operating means for reestablishing engagement of said switch arm with said second contact means and means carried by said temperature responsive means for operative engagement with said latching means for releasing said toggle plate at a predetermined temperature.

15. A thermostatic control device comprising a main switch, temperature responsive means for operating said main switch, an elongated flexible switch arm connected at one end to said main switch, first contact means initially spaced from one side of said switch arm, second contact means positioned on the opposite side of said switch arm and longitudinally spaced from said first contact means, said switch arm having an inherent bias toward engagement with said second contact means, third contact means positioned adjacent said first contact means but beyond the range of movement of said switch arm, a second flexible switch arm connected to said first contact means and having an inherent bias toward engagement with said third contact means, means on said first switch arm operatively engageable by said second switch arm, a toggle plate operatively engageable with both said switch arms, means for operating said toggle plate in one direction for moving the first said switch arm into engagement with said first contact means and moving said second switch arm out of engagement with said third contact means, said first switch arm being bowed by operation of said toggle plate between said connected end thereof and said first contact means for disengaging said second contact means, and latching means for said toggle plate effective upon movement thereof in another direction for maintaining said engagement between said first switch arm and said first contact means while said switch arm returns under said bias thereof toward engagement with said second contact means, said latching means being effective for maintaining said second switch arm out of engagement with said third contact means.

16. A thermostatic control device as claimed in claim 15 wherein means carried by said temperature responsive means are adapted for operative engagement with said latching means for releasing said toggle plate at a predetermined temperature.

17. A thermostatic control device comprising a main switch, temperature responsive means for operating said main switch, a pair of flexible switch arms connected at one end respectively to said main switch, a toggle plate supported at one end for semi-floating movement relative to said switch arms, a pair of abutments carried on said plate, and a second pair of abutments carried on said plate and spaced from the first said pair, said plate being movable for operatively engaging either of said pairs of abutments with said switch arms.

18. A thermostatic control device comprising a main switch, temperature responsive means for operating said main switch, a pair of flexible switch arms connected at one end respectively to said main switch, first contact means adapted for engagement with one side of said switch arms and forming a stop for the opposite ends thereof, second contact means adapted for engagement with the opposite side of said switch arms and being positioned intermediate said connected ends and said first contact means, said switch arms having an initial bias toward engagement with said second contact means, a toggle plate, means positioned intermediate said first and second contact means for supporting said toggle plate at one end thereof for semi-floating movement relative to said switch arms, a pair of abutments carried on said plate adjacent said second contact means, and a second pair of abutments carried on said plate and spaced from said first pair, said plate being movable for operatively engaging either of said pairs of abutments with said switch arms.

RUSSELL F. GARNER.

REFERENCES CITED

The following references are of record in the file of this patent:

UNITED STATES PATENTS

| Number | Name | Date |
| --- | --- | --- |
| 2,385,434 | Weber | Sept. 25, 1945 |
| 2,403,824 | Newell | July 9, 1946 |
| 2,496,889 | Pearce | Feb. 7, 1950 |